United States Patent [19]
Reeping

[11] Patent Number: 6,000,366
[45] Date of Patent: Dec. 14, 1999

[54] DEVICE FOR PROTECTING CASTS, SPLINTS OR BANDAGES APPLIED TO ANIMAL APPENDAGES

[76] Inventor: Judith A. Reeping, 213 LaGrande Dr., Cranberry Township, Pa. 16066

[21] Appl. No.: 09/222,273
[22] Filed: Dec. 28, 1998
[51] Int. Cl.⁶ .................................................. A01K 13/00
[52] U.S. Cl. ................................................................ 119/850
[58] Field of Search ...................................... 119/850, 856, 119/865

[56]         References Cited

U.S. PATENT DOCUMENTS

| | | | |
|---|---|---|---|
| 4,633,817 | 1/1987 | Taylor | 119/850 |
| 5,452,685 | 9/1995 | Thomas | 119/850 |
| 5,495,828 | 3/1996 | Solomon et al. | 119/850 |
| 5,676,095 | 10/1997 | Ralls | 119/850 |

*Primary Examiner*—Peter M. Poon
*Assistant Examiner*—Elizabeth Shaw
*Attorney, Agent, or Firm*—George C. Atwell

[57]                ABSTRACT

An animal protective device is provided for covering and protecting a medical appliance, such as a cast, splint, bandage or wrapping secured to one or more appendages, such as a forelimb or hindlimb, of an animal. The animal protective device includes a sleeve or tubular-shaped portion having an open upper end, a closed bottom end, and an interior cavity for receiving and containing the animal's appendage and medical appliance. The protective device is readily conformable to the respective medical appliance, and also includes adjustable securement structure for permitting either snug or loose attachment of the device to the medical appliance. In addition, the device includes outwardly-displaceable, opposed lower corners which facilitate conformation of the device to the medical appliance and diminish discomfort and awkwardness in the animal's gait when the device is attached to the medical appliance and the animal's appendage.

6 Claims, 2 Drawing Sheets

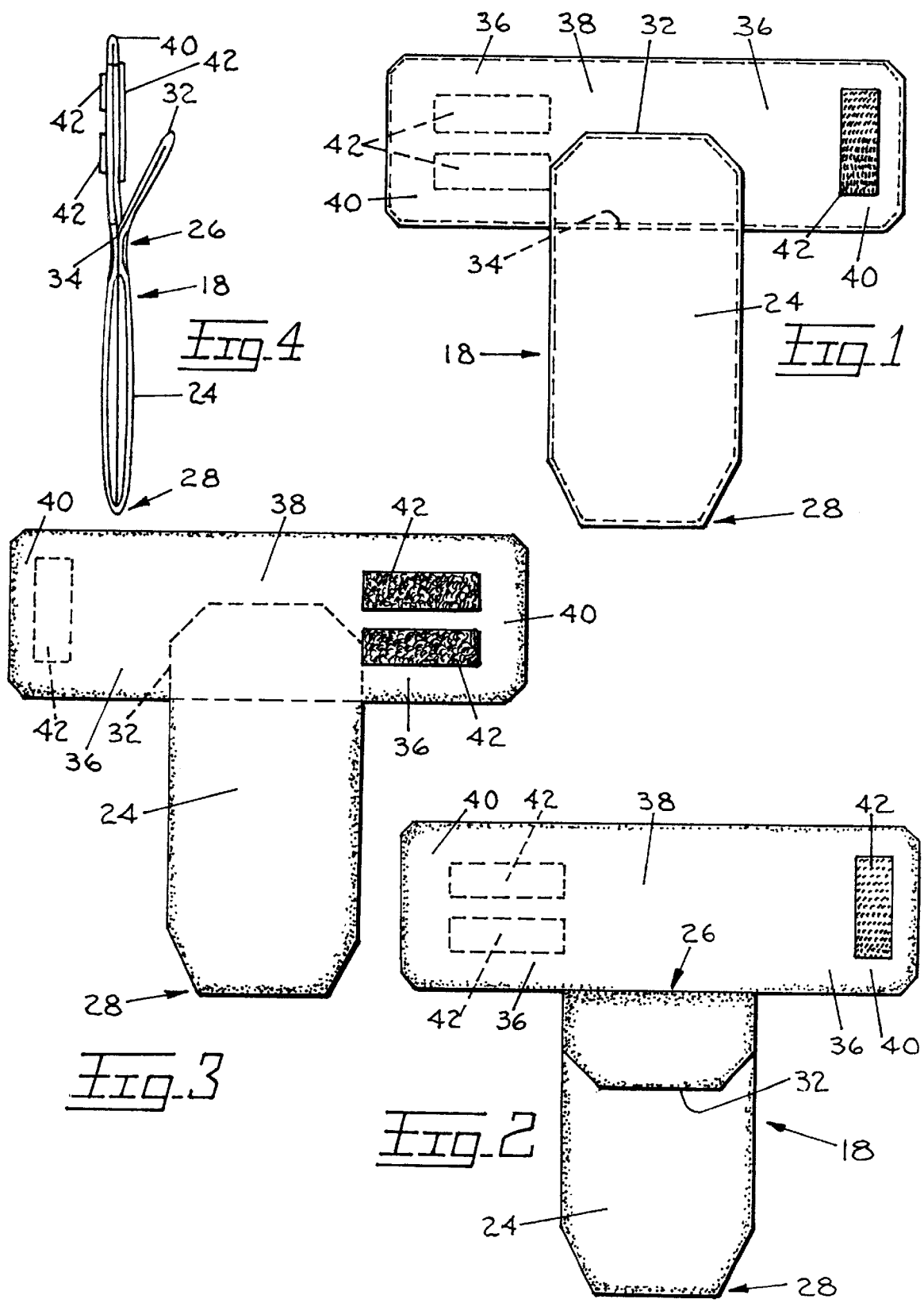

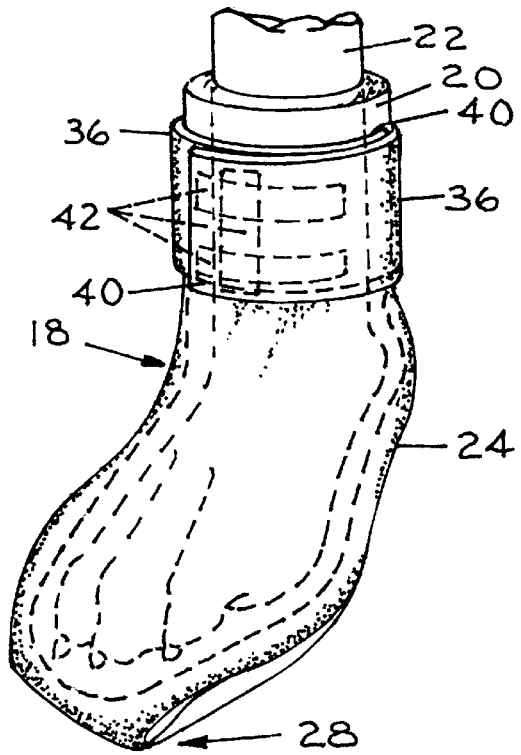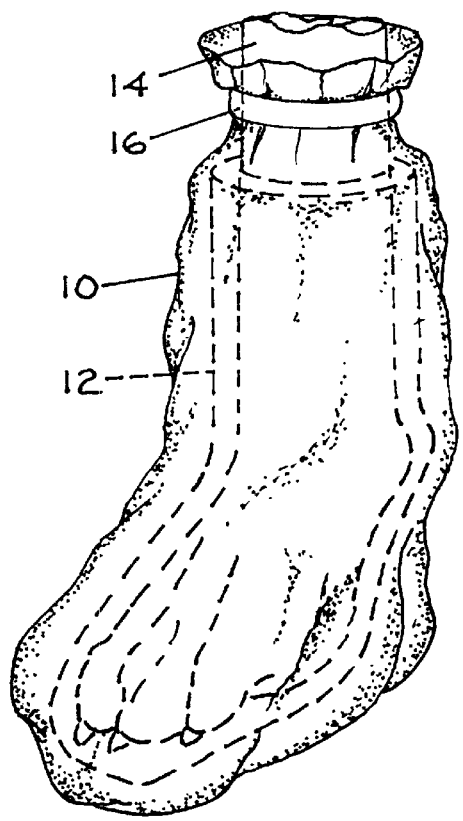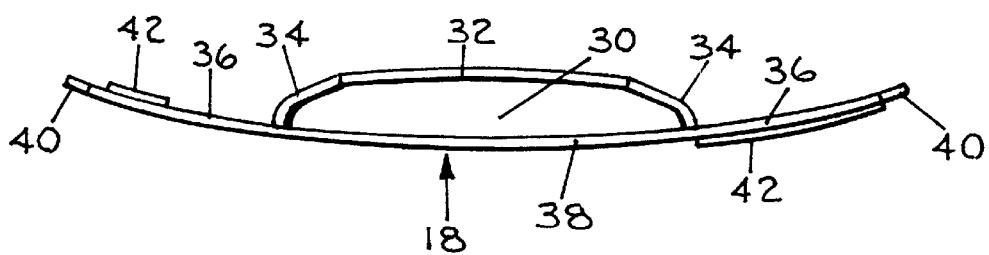

DEVICE FOR PROTECTING CASTS, SPLINTS OR BANDAGES APPLIED TO ANIMAL APPENDAGES

FIELD OF THE INVENTION

The present invention relates to a protective device for animal appendages and, more particularly, pertains to a removably-attachable animal protective device primarily adapted for covering medical appliances placed on the forelimbs or hindlimbs of an animal. Any type of injury to an animal, whether feral or domesticated, can quickly develop into a life-threatening situation. This is especially true for an injury to a feral animal—nature allows no respite from procreation, annual seasonal migrations, hunting down prey or evading predators. The rigors of the climate, vigilant predators, elusive prey, and opportunistic disease more often than not prove lethal to injured and debilitated feral animals.

The situation for injured domesticated animals and household pets, such as dogs, cats, horses and other livestock, birds, reptiles, and rodents, is certainly better than for their wild relatives. Nonetheless, upon sustaining an injury, the continued health of a housepet is not assured despite the array of drugs, surgical procedures, and rehabilitation strategies developed by contemporary veterinary science.

For example, one of the most difficult and frustrating tasks of any pet owner is the continuous struggle to keep the wound or injured area clean, dry, and free from dirt and infection. The injury or wound is first treated medically by surgery and/or antibiotics administered topically or internally, and then the injury or wound is wrapped, covered, contained or held immobile by a medical appliance, such as a cast, splint or bandage. Casts can be hard casts made of fiberglass or soft casts made from a pliable bunting material. A medical appliance secured to the forelimb or hindlimb of an animal may need to remain in place for weeks or even months; yet the animal will not stay quiescent but will return to its former ways, dragging the bandaged or splinted limb therealong as it gambols about the house and yard.

In many cases, the injured animal will also desire or require daily outdoor walks in all sorts of weather for exercise, play, and relief of bodily functions. The cast or bandage will gradually deteriorate over a period of time from the accumulation of debris and moisture which are absorbed and retained by the cast or bandage material.

Moreover, the pet owner must fight a daily battle to keep the animal from licking, rubbing, scraping, gnawing or biting on or through the medical appliance since it is an unnatural object. Therefore, it is crucial that the integrity of the cast, splint or bandage be maintained in order for the injury to remain clean, dry, and free from dirt and infection for proper healing of the injury or wound.

DESCRIPTION OF THE PRIOR ART

In order to keep the animal's cast, splint or bandage clean, dry, and dirt-free, a number of makeshift devices have been devised as a result of the veterinarian's suggestion or the pet owner's ingenuity.

The simplest type of protective covering is a plastic bag or a bread bag. The open end of the flexible bag is slipped onto and over the animal limb and medical appliance and encompasses the medical appliance. The bag is secured to the animal's limb by tape, string or rubber bands wrapped or tied around the upper open end of the bag.

There are a number of shortcomings in using plastic bags or bread bags as protective covering devices. First, the animal is usually able to walk completely out of the bag because the bag cannot be fastened tightly enough around the animal's limb above the medical appliance without causing discomfort for the animal and because the flimsy material from which the bag is manufactured causes the bag to easily tear and rip. The bag is ill-fitting and awkwardly conforms to the configuration of the medical appliance. Furthermore, the bag is noisy and flops around, and the animal tries to immediately step out of the bag or shake the bag off. Plastic or bread bags are difficult to put on and often require two adults—one adult to hold and guide the animal's limb into the bag, and the other adult to fasten the bag onto the animal's limb. In addition, a cast, splint or bandage tends to rub through a covering composed of the light, flimsy, non-durable material. Also, the non-durable bag material will allow slits or tears to form, thereby allowing dirt and moisture to gradually permeate the medical appliance and impair wound healing. Finally, when tape is used to secure the bag onto the medical appliance, both the bag and the bandage will tear during removal of the tape for adjusting the bag, checking the cast or bandage, or removing the cast or bandage. Thus, the bag is rendered unusable and the integrity of the medical appliance is marred.

I.V. bags are also used as makeshift protective coverings for medical appliances but suffer from many of the same shortcomings as bread bags and plastic bags. I.V. bags are awkward and ill-fitting and do not naturally conform to the shape of the cast, splint or bandage. Although I.V. bags are composed of a durable, translucent plastic material, when secured to the animal's limb at their upper open end, they tend to gather and bunch about the limb, and allow gaps to form which provide pathways for moisture, dirt, and infectious agents.

A representative protective paw covering is disclosed in U.S. Pat. No. 5,495,828. The Solomon et al. device is an animal boot comprising a sleeve having an upper open end and an adjustable fastening strap. The sleeve is uniform in structure and devoid of seams or stitches which, according to Solomon, assists in rendering the boot waterproof. Solomon's device is strictly for covering an animal's paw; there is nothing in Solomon which suggests that his boot could be readily adapted for covering and protecting both the paw or limb of the animal and also a medical appliance, such as a cast, splint or bandage, secured thereto.

SUMMARY OF THE INVENTION

The present invention comprehends an animal protective device and, more particularly, comprehends a reusable, removably-attachable, sleeve-like device for covering and protecting a medical appliance, such as a soft or hard cast, a splint, bandage or wrapping, placed on an animal appendage, such as the animal's forelimb or hindlimb.

The animal protective device of the present invention includes an elongated sleeve, pouch or tubular-shaped portion. The sleeve maintains a generally uniform circumference when disposed over the medical appliance for securement to the animal's forelimb or hindlimb. The sleeve has a seamless, closed lower end or bottom that includes popped-in corners and an opposite open upper end, and defines an interior, elongated cavity which extends from the open upper end to the bottom. Both the animal's limb and the attached medical appliance are received and contained within the cavity.

In order to direct the animal's limb and the medical appliance into the open cavity, a flexible member is attached to the rim at the upper open end of the sleeve. The flexible member functions as a guide tongue or ramp for directing the limb and appliance into the cavity. The device also includes an adjustable securement means in the form of two oppositely-projecting, flexible wings or flaps attached along the rim adjacent the upper open end of the sleeve. The wings or flaps wrap around the animal limb and medical appliance and are attached together at their distal ends for securing the protective device onto both the limb and the medical appliance.

It is an objective of the present invention to provide an animal protective device which can be easily and quickly placed onto and over the medical appliance.

It is another objective of the present invention to provide an animal protective device having adjustable securement structure which permits either snug or loose securement of the device onto both the limb and medical appliance.

Yet another objective of the present invention is to provide an animal protective device having an integral tongue for guiding the animal's limb into the cavity of the protective device.

Still another objective of the present invention is to provide an animal protective device having popped-in corners at its lower end which can expand outwardly to accommodate variously-sized casts, splints or bandages so that the animal can ambulate in the device without discomfort or awkwardness.

These objectives, together with other objectives and advantages which will become subsequently apparent, reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

FIG. 1 is a front elevational view of the animal protective device;

FIG. 2 is a front elevational view of the animal protective device showing the guide tongue folded downward against the sleeve;

FIG. 3 is a rear elevational view of the animal protective device;

FIG. 4 is a side elevational view of the animal protective device;

FIG. 5 is a top plan view of the animal protective device;

FIG. 6 is a perspective view of the animal protective device placed on a medical appliance and animal appendage; and FIG. 7 is an illustration in a perspective view of a prior art medical appliance covering.

DETAILED DESCRIPTION OF THE PREFERRED EMBODIMENT

Illustrated in FIGS. 1–6 is an animal protective device, or animal boot, for covering and protecting a medical appliance, such as a soft or hard cast, splint, bandage or wrapping, applied to an appendage of an animal, which, in the majority of cases, would be either a hindlimb or a forelimb of the animal. The size of the animal protective device can vary so that the device can be used to cover and protect medical appliances placed on appendages of domesticated animals, livestock or even injured zoo animals, during their post-injury recovery period. The material composing the device is preferably a cloth-backed vinyl which is cut into a variety of sizes and then sewn to the proper form using templates. The cloth-backed vinyl is a waterproof material which is sewn into the form of the animal protective device by using nylon thread, which is also waterproof. The device can be sewn into a number of different sizes, and the seams are also sealed to insure additional waterproofing. Irrespective of its particular size, the device is flexible, and readily and easily conforms to the shape or configuration of the medical appliance which has already been placed upon one or more of the appendages of the animal.

Illustrated in FIG. 7 is a typical prior art device 10 used in covering a medical appliance 12 attached to an appendage 14 of an animal (not shown). The device 10 shown in FIG. 7 is a plastic bread bag which loosely fits over the medical appliance 12 and the appendage 14 and is attached at its upper open end to the appendage 14 by a rubber band 16. The device 10 loosely and awkwardly fits onto and over the medical appliance 12, and the tautness of the attached band 16 tends to tear the device 10. In addition, the integrity of the device 10 degrades fairly quickly due to its thin plastic composition.

Illustrated in FIGS. 1–6 is an animal protective device 18 of the present invention. While the device 18 can be used indoors, the device 18 is primarily intended for outdoor use. The device 18 is a flexible, readily and easily conformable, waterproof protective covering for both a medical appliance 20 and an appendage 22 of an animal (not shown). The device 18 is essentially a one-piece unit that includes two primary structures which are integrally attached to each other. The first structure is a tubular-shaped portion, pouch, boot, or sleeve 24 which may be considered the major body portion of the device 18. The sleeve 18 is elongated for receiving the medical appliance 20 and a substantial portion of the appendage 22, and generally maintains the same circumferential dimension throughout its length. In addition, the sleeve 24 generally maintains the same diameter throughout its length when disposed onto the medical appliance 20, as shown in FIG. 6. The sleeve 24 includes an open upper end 26, which initially receives and allows passage therethrough of the medical appliance 20 and appendage 22, and an opposite closed portion or bottom end 28. Furthermore, as shown in FIG. 4, the sleeve 24 defines an interior receptacle or cavity 30 which extends from the open upper end 26 to the closed bottom end 28. Notwithstanding the variable sizes of the device 18 and of the medical appliances 20, the cavity 30 receives and contains therein a substantial portion of the medical appliance 20, or the entire medical appliance 20, as well as a substantial portion of the appendage 22.

As shown in FIGS. 1–4, the device 18 includes an integrally-attached means for directing the medical appliance 20 and the appendage 22 into the cavity 30 of the sleeve 24. In the present invention, this means includes a flexible flap or guide tongue 32 which is integrally attached to the rim 34 of the sleeve 24 adjacent the open upper end 26. In its normal disposition, the guide tongue 32 will serve as a ramp and be angularly inclined away from the longitudinal axis defined by the extension of the cavity 30 so that the guide tongue 32 is predisposed for receiving and directing the medical appliance 20 and the appendage 22 into the cavity 30. The user simply slides the medical appliance 20 along the surface of the guide tongue 32 until the medical appliance 20 reaches the rim 34 of the sleeve 24 whereupon the device 18 can simply be pulled upwardly onto the medical appliance 20, which action causes the medical appliance 20 to be received and contained within the cavity 30, or the appendage 22 and appliance 20 can be slid into the cavity 30. The guide tongue 32 does not need to extend along the complete perimeter of the rim 34 in order to effectively direct the medical appliance 20 and appendage 22 into the cavity 30.

As illustrated in FIGS. 1–6, the device 18 includes a means for securing the sleeve 24 to the medical appliance 20 and appendage 22. The securement means can be either integrally formed from the sleeve 24 or joined to the sleeve 24 contiguous to the rim 34. In the device 18 of the present invention, the securement means includes a pair of generally rectangular-shaped, oppositely-projecting, flexible flaps or wings 36 which are secured to the sleeve 24 along a portion of the perimeter of the rim 34 adjacent the upper open end 26. The wings 36 are integrally joined to each other by an integral medial portion 38, and it is the medial portion 38 which is formed to the sleeve 24 along a portion of the perimeter of the rim 34. The wings 36 are flexible and pliable in order to wrap completely around the medical appliance 20 and appendage 22 as shown in FIG. 6. Therefore, each wing 36 includes a distal wing end 40 which is wrapped around the medical appliance 20 for securement to the other wing end 40.

As shown in FIGS. 1–6, the wings 36 include, adjacent their respective wing ends 40, an adjustable securement means for allowing the wings 36 to be secured to each other, in either a loose or snug manner, to achieve both a secure and comfortable fit on the medical appliance 20 and appendage 22. The adjustable securement means includes a plurality of rectangular-shaped strips 42 of material which have an adhesive backing and a plurality of hook-and-loop attachment projections and is known by the tradename VELCRO. The device of the present invention utilizes three adhesive securement strips 42; two strips 42 are attached to one distal wing end 40 and are disposed in a spaced-apart, horizontal orientation, while the third strip 42 is attached in a vertical orientation to the opposite wing end 40. The configuration of securement strips 42 shown in FIGS. 1–5 is only one of a number of possible configurations which could be used, dependent upon the size of the entire device 18 and the length and width of the wings 36. The use of VELCRO strips 42 for the adjustable securement means permits quick and easy removable attachment of the wings 36 to each other so that the wings 36 can be adjusted and readjusted to accommodate the particular size of the medical appliance 20 and appendage 22 while achieving a secure attachment to each other for encompassing the medical appliance 20 and/or appendage 22. The use of VELCRO strips 42 also allows the wings 36 to be quickly unbound from each other so that the device 18 can be easily removed from the appendage 22 as the situation may warrant.

With reference to FIGS. 1–6, it is an easy matter to insert the medical appliance 20 and appendage 22 into the cavity 30 of the device 18. Because of the many built-in aforedescribed elements of the device 18, a single individual can place the device 18 onto the medical appliance 20. The individual first unfastens or unbinds the wing ends 40 from each other so that the wings 36 are disposed in the orientation of FIGS. 1–3, if the wings 36 are not already in that orientation. The individual then gently grasps the injured appendage 22 and brings it into contact with the guide tongue 32, whereupon the individual either gently pulls the device 18 upward, which causes the appendage 22 to follow the guide tongue 32 into the cavity 30, or the individual gently guides the appendage 22, with the medical appliance 20 placed thereon, downwardly along the surface of the guide tongue 32 and into the cavity 30. The animal will then be in the standing position, allowing the individual to gauge how well the cavity 30 has accommodated the particular type of medical appliance 20. It should be noted that some splints have squared-off lower corners which would cause the popped-in corners at the bottom 28 of the sleeve 24 to be outwardly displaced in order for the sleeve 24 to comfortably accommodate the splint; however, many types of casts and soft bandages have rounded lower bottoms and their insertion into the cavity 30 would not cause the outward displacement of the popped-in corners. Some minor adjustment may be necessary to make certain that the bottom of the medical appliance 20 is contiguous with the inner bottom surface of the closed lower end 28 of the sleeve 24. The individual then wraps both wings 36 around the medical appliance 20 and appendage 22 so that the wing ends 40 are brought together whereby the VELCRO strips 42 can be pressed together for securing the wings 36 to each other about the medical appliance 20 and appendage 22. Thus, the device 18 is quickly and easily placed onto the appendage 22 with a minimum of discomfort for both the animal and the individual.

Although a preferred embodiment of the present invention has been illustrated and described, it will be apparent to those skilled in the art that various changes and modifications may be made therein without departing from the spirit of the invention or the scope of the appended claims.

I claim:

1. A device for covering and protecting a medical appliance attached to an animal's appendage, comprising:

an elongated, tubular-shaped portion of generally uniform circumference and diameter, the tubular-shaped portion including a closed bottom end, an open upper end defined by a perpheral rim, and an elongated cavity extending from the upper end to the bottom end for receiving and encompassing therein the medical appliance and the animal's appendage;

the closed bottom end including oppositely-disposed corners that are outwardly displaceable as a result of the insertion of the medical appliance and animal appendage into the cavity so that the bottom end comfortably conforms to the medical appliance;

a pair of oppositely-disposed flexible wings attached to the rim adjacent the open upper end and each wing having a distal wing end whereby the wings conformably encircle the medical appliance and animal appendage so that the distal wing ends can be secured to each other for holding the device in place on the medical appliance and animal appendage; and a guide tongue attached to the rim and extending outwardly away from the cavity whereupon the medical appliance slides upon the guide tongue and is thereby directed into the cavity.

2. The device of claim 1 wherein each wing includes an adjustable securement means attached to each respective distal wing end for allowing the removable attachment of the wings to and from each other.

3. The device of claim 2 wherein the adjustable securement means permits the snug or loose attachment of the wings to each other and around the medical appliance and animal appendage.

4. A device for covering and protecting a medical appliance placed on an appendage of an animal, comprising:

an elongated, flexible sleeve having a closed bottom end, an opposite open upper end defined by a peripheral rim, and an elongated cavity extending from the open upper end to the closed bottom end for receiving and containing therein a substantial portion of the medical appliance and the animal's appendage;

the closed bottom end including oppositely-disposed corners which can be outwardly displaced as a result of the insertion of the medical appliance into the cavity so that the bottom end comfortably conforms to the medical appliance;

a pair of oppositely-disposed flexible wings attached to the rim adjacent the open upper end and each wing including a distal wing end whereby the wings conformably encompass the medical appliance so that the distal wing ends can be secured together for holding the sleeve in place on the medical appliance;

a guide means attached to the sleeve for directing the medical appliance and appendage into the cavity; and adjustable securement means mounted on each wing for allowing the removable attachment of the wings to each other so that the wings can encompass the medical appliance for attachment at their respective distal wing ends.

5. The device of claim 4 wherein the adjustable securement means includes a plurality of securement strips disposed in vertical and horizontal orientation on both wing ends for fastening together after the wings are wrapped around the medical appliance and appendage.

6. The device of claim 4 wherein the guide means includes a guide tongue attached to the rim of the sleeve and which is biased outwardly away from the cavity so that the medical appliance can contact and slide on the guide tongue for leading the medical appliance into the cavity of the sleeve.

* * * * *